Patented July 11, 1933

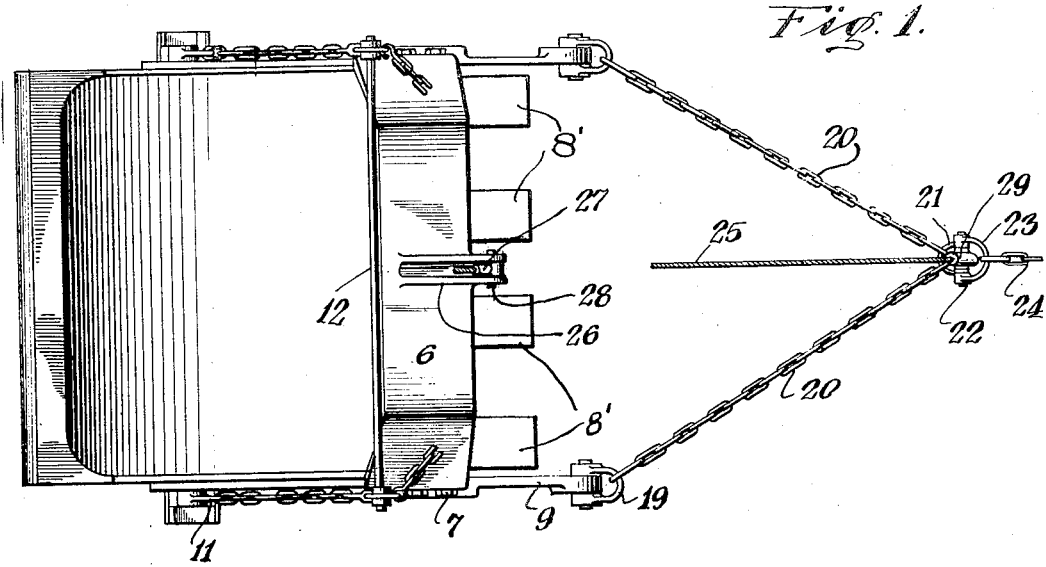
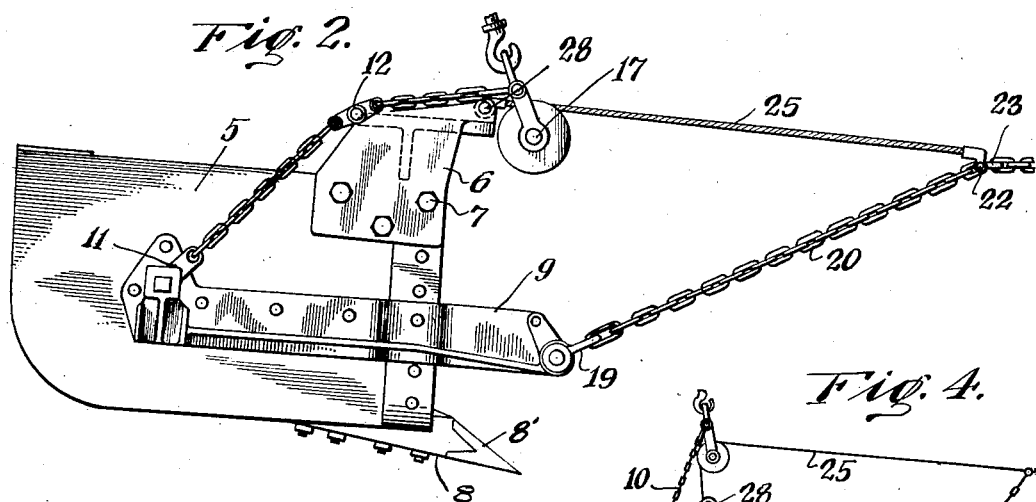
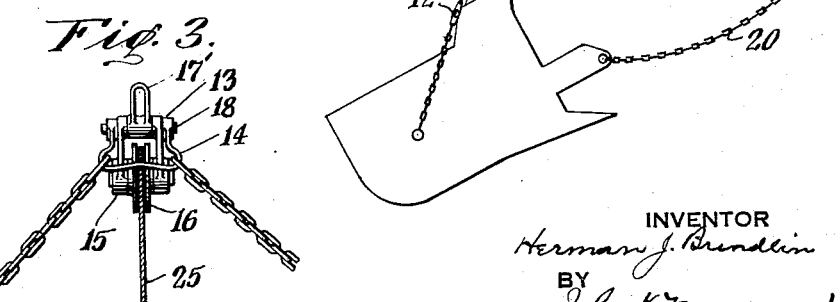

1,917,492

UNITED STATES PATENT OFFICE

HERMAN J. BRENDLIN, OF NEW YORK, N. Y., ASSIGNOR TO THE HAYWARD COMPANY, OF NEW YORK, N. Y., A CORPORATION OF NEW YORK

EXCAVATING SHOVEL

Application filed December 6, 1929. Serial No. 412,011.

This invention is an improvement upon the type of shovel shown in U. S. patent to C. A. Morris, No. 1,022,638, of April 9, 1912; my own patent of Sept. 1, 1925, No. 1,552,033, and my pending application Serial No. 137,934. The present invention is intended to simplify and improve the operating rigging.

In the drawing Fig. 1 is a top-view with portions broken away;

Fig. 2 is a side-view of the shovel in digging position;

Fig. 3 is a detail view, and

Fig. 4 is a diagrammatic view showing the shovel in carrying position.

Referring to the drawing in detail, 5 represents the shovel which, in most respects, is the same in construction as that shown in the patents above referred to, being closed at the bottom and rear, but open at the top and front. Unlike the shovel just referred to, the present shovel is provided with a hood 6 riveted to either side as at 7, thus making it possible to provide a much lighter shovel without the sacrifice of strength. The relative position of the front of the hood 6 with respect to the cutting-edge of the shovel is an important consideration, as will presently appear. At the lower front edge of the bottom the shovel is provided with a cutting-edge 8 connected to which are the usual digging-teeth 8′, and the front end is provided with draft-lugs 9 intermediate the height of the shovel. A suspending-bridle 10, composed of two members, is connected to the rear of the centre of gravity, as at 11, said members extending upwardly to a spreader-bar 12; whence they continue to the pulley-block 13, shown in Figs. 2, 3 and 4. As more clearly shown in Fig. 3, this pulley-block consists of a bail or clevis 14, to which the upper ends of the suspending-bridle 10 are attached, and another bail or clevis 15, within which is secured the pulley or sheave 16 by means of the metal shaft 17, which passes through the hub of the pulley and also the two eyes of the bail or clevis 15. Both of said bails 14 and 15 are secured to a suspending bail or clevis 17′ by means of shaft 18.

Attached to the draft lugs 9 by means of clevises 19 is a draft bridle 20, comprising two forwardly converging members, which at their forward ends are connected to a bail or clevis 21, which in turn is connected to bail or clevis 23 by means of the pin 22, and attached to the bail 23 is a drag line 24.

An adjustable control line is now connected to the hood 6 and the drag line 24. In the present instance I have shown a clevis 26 formed integrally with the upper face of the hood 6, to which the inner end of the adjustable control line 25 is attached by means of a rope-clamp 27 pivoted to shaft 28. To the outer end of said control line 25 is fixed a rope-clamp 29, which is pivoted to the shaft 22, which is common to the bails 21 and 23. Preferably the adjustable control line is composed of wire strands, and wedges may be employed for holding the ends securely within the respective rope-clamps in any desired adjustment. Fig. 2, however, shows the shovel in proper digging position, the tilting angle of which is due to the co-operating action of both the draft bridle and the adjustable control line.

During the digging and loading operation the fall rope (not shown) attached to the bail 17 is, of course, permitted to remain slack. During the operation of transporting the load to the dump, the drag line 24 is held taut, with the result that the forward end of the shovel is held up to prevent spilling the contents, as shown in Fig. 4. When the dump is reached, however, the drag line 24 is slackened, causing the forward end of the shovel to drop by gravity and thereby discharge the load.

Having thus described my invention, what I claim is:

1. In a device of the class described, the combination of a shovel having a hood over its front portion, a suspending-bridle connected to the shovel rearwardly of its centre of gravity, a draft-bridle connected to the forward end of the shovel, a drag-line connected to said draft-bridle, a control line having one end connected to said drag line and the other end connected to said hood, said control line having such length relatively to said draft-bridle that when power is applied to said drag-line it is imparted to the control line in advance of the draft-bridle to tilt the bucket into its proper digging angle, and slidable means on said control line connected to said suspending-bridle for tilting the forward end of the shovel upwardly during the carrying operation.

2. In a device of the class described, the combination of a shovel having a hood over its front portion, a suspending-bridle connected to the shovel rearwardly of its centre of gravity, a draft-bridle connected to the forward end of the shovel, a drag-line connected to said draft-bridle, a control line having one end connected to said drag-line and the other end connected to said hood, said control line having such length relatively to said draft-bridle that when power is applied to said drag-line it is imparted to the control-line in advance of the draft-bridle to tilt the bucket into its proper digging angle, and a sheave connected to said control line and to said suspending-bridle for tilting the forward end of the shovel upwardly during the carrying operation.

H. J. BRENDLIN.